March 12, 1935.  E. MOLLER ET AL  1,993,940
BRAKE PIPE VENT VALVE DEVICE
Filed Aug. 6, 1931
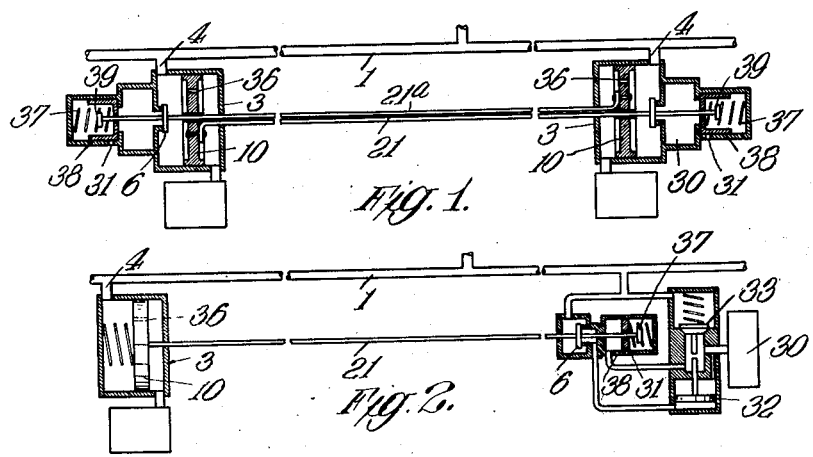

Patented Mar. 12, 1935

1,993,940

UNITED STATES PATENT OFFICE 1,993,940

BRAKE PIPE VENT VALVE DEVICE

Ernst Moller, Karlshorst, Berlin, and Friedrich Hildebrand, Lichterfelde, Berlin, Germany, assignors to Knorr-Bremse Aktiengesellschaft, Lichtenberg, Berlin, Germany, a corporation of Germany Application August 6, 1931, Serial No. 555,610 In Germany June 26, 1931

5 Claims. (Cl. 303—82)

The subject of this invention is a valve arrangement for discharging air from the brake pipe in compressed air brake equipment, whereby a very considerable increase of the speed with which a pressure-variation in the compressed air brake pipe advances is produced owing to the fact that a valve situated at one end of a railway vehicle, under the influence of the pressure changing wave reaching the said valve, immediately causes a valve situated at the other end of the vehicle to discharge the air from the brake pipe, that is to say it produces a new independent impulse passing on in advance of the impulse initiating this action, which is repeated from carriage to carriage. The effect of this is that, practically, the pressure-changing impulse even in a long train reaches the last vehicle almost at the same moment as when it reaches the first valve of this arrangement on the first vehicle.

A valve arrangement serving this purpose is already known. In this known arrangement, a brake pipe discharge valve is also arranged on the end of each vehicle. Both valves are connected together by a draw rod and so arranged that, when a pressure-reducing wave advancing in the brake pipe reaches one of the valves, both valves are opened and discharge the air from the brake pipe into the open air.

In the case of the known arrangement, the control pistons of the valves are arranged vertically and engage with an arm of a three-armed lever or of a bell-crank lever, whose fulcrum lies at a certain distance from the point of engagement of the piston and to the other arm of which the draw rod is linked which leads to the valve arrangement situated at the other end of the vehicle.

In the known arrangement, both valves are opened simultaneously, and the brake pipe of one vehicle is placed in communication with the open air at two points. This results in a rather high resistance of the arrangement to the opening motion, and moreover, the opening lift of the valve body amounts to only a part of the movement of the piston associated with it.

The arrangement according to the invention is based substantially on the same principle, but is superior to the known arrangement by reason of the fact that the piston for actuating the brake pipe discharge valve and a relay valve arranged in front of this latter is disposed coaxially with the valve controlled by it, so that the opening lift of the valve is just as great as the piston stroke. Moreover, the arrangement according to the invention has, as compared with the known arrangement, the advantage that it is in a higher degree sensitive to pressure-reductions in the brake pipe than this known arrangement, because the piston encountered by the pressure-changing wave has in each case only one valve to open. Therefore, with regard to consumption of compressed air the arrangement according to the invention is more economic than the known arrangement, because the brake pipe discharges its air through the brake pipe discharge valve, not into the open air, but into a chamber of limited capacity.

In a special constructional form of the invention, the sensitiveness to slighter pressure changes in the brake pipe is increased owing to the fact that the control piston reached by the pressure-changing wave has to move only a relatively small relay valve which is only lightly loaded and therefore offers only slight resistance, and through which compressed air flows to the piston influencing the actual brake pipe discharge valve when the relay valve is open.

In Figures 1 and 2 of the accompanying drawing, two constructional examples of the invention are schematically illustrated by way of example, partly in section.

In the constructional form according to Figure 1, cylindrical valve bodies 3 are connected to the brake pipe 1 in the neighborhood of the ends of the vehicle by means of the connecting members 4. In each valve body is situated a piston 10. To each piston 10 a draw rod 21 is secured, on which a brake pipe outlet valve 6 is arranged. The valve 6 keeps the communication between the main part of the body 3 and a chamber 30 closed. The piston 10 has a throttle boring 36 through which a pressure equalization between the spaces situated on both sides of the piston 10 takes place. On the rod 21 is situated a displaceable piston 38, which is held by a spring 37 in a position in which it closes a throttle boring 31. The rod 21 ends in a collar 39, which lies as far from the head of the piston 38 as is necessary for the sufficient opening of the valve 6.

If the pressure in the brake pipe 1 is reduced for the purpose of braking, the piston 10 first reached by the pressure-reducing wave is freed from load on the side facing towards the brake pipe 1 and displaced in the direction of the pipe coupling 4. It thus opens at the same time the valve 6 in the valve arrangement situated at the other end of the vehicle, and the brake pipe is immediately placed in communication with the chamber 30 at this other end of the vehicle. Therefore, independently of the pressure-reducing wave which has reached the piston 10, a new pressure-changing wave is generated therein which is independent of the first mentioned wave and passes on in advance thereof to the extent of the distance between the two valve arrangements. The same process takes place in rapid succession from one carriage to the other. By the opening of the valve 6 and the flowing over of air from the pipe into the chamber 30, the other piston 10 is also freed from load on one side. However, as long as equality of pressure does not prevail on both sides of the first-mentioned piston, it cannot be displaced. When the valve 6 is opened, the collar 39 of the rod 21 bears inwardly on the head of the piston 38. If equality of pressure is now brought about through the boring 36 on both sides of the piston 10 which has opened the valve 6, the pressure in the chamber 30 filled with compressed air through the open valve 6 is able to displace the piston 38. This piston leaves the boring 31 open and returns the piston 10 into its initial position, closes the valve 6 and allows the compressed air to escape from the chamber 30 through the aperture 31. As soon as the pressure in the chamber 30 is less than the pressure of the spring 37, this spring forces the piston 38 back, which then closes the aperture 31 again.

In Figure 2, only the valve arrangement situated at one end of the vehicle and the control piston associated therewith and situated at the other end together with the cylinder enclosing it are illustrated for reasons of simplicity of illustration. It must be imagined that a cylinder 3 with piston 10 and a valve are present at each end of the vehicle.

In the case of this constructional form, when the piston 10 is reached by the pressure-reducing wave in the brake pipe 1 and is displaced in the direction of the brake pipe coupling 4, it only needs to overcome the slight resistance of the relay valve 6 arranged coaxially with it on the wire 21. This relay valve is thus opened immediately upon a slight reduction of pressure in the brake pipe and allows compressed air to flow out of the brake pipe under the piston 32, which lifts the brake pipe discharge valve 33 and places the brake pipe 1 in communication with the chamber 30. Brake pipe air immediately passes to the side of the return piston 38 facing toward the valve 6. As soon as the pressure on either side of the piston 10 has been equalized through the boring 36, the piston 38 draws back the rod 21 with the piston 10, the spring 37 being compressed by means of the collar 39, whereby the valve 6 is closed. The compressed air which has displaced the piston 38 escapes through the boring 31 left free by this piston, it being assumed that the pressure in the chamber 30 and in the brake pipe has been equalized and has consequently closed the valve 33.

It is to be understood that the forms of the invention herewith shown and described are merely illustrative of preferred embodiments and that such changes may be made as fall within the purview of one skilled in the art without departing from the spirit of the invention or the scope of the appended claims.

What we claim and desire to secure by Letters Patent of the United States is:—

1. In combination with a pressure medium pipe, a plurality of valve sets spaced apart from each other, each of said sets comprising a piston chamber in communication with said pipe, a piston in said chamber responsive to variations of pressure in said pipe, a valve operable by a draw rod adapted to work through a perforation in the piston of the same set, said rod being firmly connected to the piston of an adjacent set, and means on said draw rod to delay the opening of said valve until a predetermined movement of said rod has been effected.

2. In combination with a pressure medium pipe, a plurality of valve sets spaced apart from each other, each of said sets comprising a piston chamber in communication with said pipe, a piston in said chamber responsive to variations of pressure in said pipe, a valve operable by a draw rod adapted to work through a perforation in the piston of the same set, said rod being firmly connected to the piston of an adjacent set, and means operatively connected to said draw rod to delay the opening of said valve until a predetermined movement of said rod has been effected, said means consisting of an auxiliary piston loaded with a return pressure spring, said auxiliary piston being connected with the valve with play.

3. In combination with a pressure medium pipe, a plurality of valve sets spaced apart from one another and situated at the ends of the vehicle, each of said sets comprising a piston chamber in communication with the pressure medium pipe, a piston in the said piston chamber responsive to pressure variations in the pipe, a valve operable by means of a draw rod firmly connected with the piston in the device situated at one end of the vehicle, and the valve situated in the device at the other end of the vehicle, the draw rod passing loosely through the piston acting on the valve of the valve device situated at the other end of the vehicle.

4. In combination with a pressure-medium pipe, a plurality of valve sets spaced apart from one another, each of them comprising a piston chamber in communication with the pressure-medium pipe, a piston in said piston chamber responsive to pressure alterations in the pressure-medium pipe, a valve operable by means of a draw rod firmly connected with the piston situated in one valve device and the valve in the other valve device, the draw rod passing loosely through the piston acting on the valve in the other valve device, a chamber controlled by the valve, a return piston loosely coupled with the draw rod controlling an outlet aperture of the said chamber.

5. In combination with a pressure-medium pipe, a plurality of valve sets spaced apart from one another, each comprising a piston chamber in communication with the pressure-medium pipe, a piston in said piston chamber, the piston connected by a draw rod with a relay valve controlling the communication between the pressure medium pipe and another piston chamber, the latter containing a piston acting on a valve for removing air from the pressure-medium pipe into a receiving chamber, coupled with play with the draw rod, and a return piston controlling an aperture for extracting air from the receiving chamber.

ERNST MOLLER.
FRIEDRICH HILDEBRAND.